United States Patent [19]
Harase

[11] Patent Number: 5,155,663
[45] Date of Patent: Oct. 13, 1992

[54] MEMORY CARTRIDGE SYSTEM WITH ADAPTER

[75] Inventor: Toshikatsu Harase, Tokyo, Japan

[73] Assignee: Fuji Photo Film Co., Ltd., Kanagawa, Japan

[21] Appl. No.: 656,650

[22] Filed: Feb. 19, 1991

[30] Foreign Application Priority Data

| Feb. 19, 1990 | [JP] | Japan | 2-15757[U] |
| Feb. 19, 1990 | [JP] | Japan | 2-15758[U] |
| Mar. 28, 1990 | [JP] | Japan | 2-32036[U] |
| Apr. 6, 1990 | [JP] | Japan | 2-37235[U] |

[51] Int. Cl.$^5$ .................. H05K 1/14; H01R 31/06
[52] U.S. Cl. .................. 361/395; 439/651; 273/148 B
[58] Field of Search ........... 360/94; 358/906, 909; 369/291, 292; 439/680, 681, 638, 650, 651, 64, 357, 358, 351; 273/148 B, 435; 235/492, 441; 361/212, 220, 390, 391, 395, 399

[56] References Cited

U.S. PATENT DOCUMENTS

| 3,644,684 | 2/1972 | Tsuji | 360/94 |
| 3,662,123 | 5/1972 | Huber | 360/94 |
| 4,149,027 | 4/1979 | Asher et al. | 361/399 X |
| 4,480,835 | 11/1984 | Williams | 439/137 X |
| 4,489,351 | 12/1984 | d'Alayer de Costemore d'Arc | 358/906 X |
| 4,494,809 | 1/1985 | Soloman | 439/638 X |
| 4,558,384 | 12/1985 | Umeda | 360/94 |
| 4,602,300 | 7/1986 | Ogata et al. | 360/94 X |
| 4,688,121 | 8/1987 | Castagne | 360/94 |
| 4,744,399 | 9/1988 | Fujita et al. | 235/441 |
| 4,780,603 | 10/1988 | Hamada | 235/492 |
| 4,812,634 | 3/1989 | Ohta et al. | 235/492 |
| 4,844,465 | 7/1989 | Hibino et al. | 273/148 B |
| 4,850,891 | 7/1989 | Walkup et al. | 439/64 X |
| 4,899,330 | 2/1990 | Einhaus | 369/292 X |
| 5,032,921 | 7/1991 | Harase et al. | 358/909 X |
| 5,034,804 | 7/1991 | Sasaki et al. | 358/209 X |
| 5,049,728 | 9/1991 | Rovin | 235/492 |
| 5,062,100 | 10/1991 | Verhoeven et al. | 369/291 |

FOREIGN PATENT DOCUMENTS

| 77876 | 5/1983 | European Pat. Off. | 360/94 |
| 58-143474 | 8/1983 | Japan | 360/94 |
| 59-101085 | 6/1984 | Japan | 360/94 |
| 1-166475 | 6/1989 | Japan | 439/680 |

Primary Examiner—Leo P. Picard
Assistant Examiner—Michael W. Phillips
Attorney, Agent, or Firm—Sughrue, Mion, Zinn, Macpeak & Seas

[57] ABSTRACT

A memory cartridge system having a compact memory cartridge and an adapter which mounts a compact memory cartridge within a reproducing apparatus designed for a standard memory cartridge of a larger size. The adapter with the compact memory cartridge being mounted thereon is substantially the same shape and size as the standard memory cartridge. According to a preferred embodiment, the adapter has a connector for electrical connection with the compact memory cartridge and a connector to be coupled to the reproducing apparatus. The compact memory cartridge is connected electrically to the reproducing apparatus via the adapter. The compact memory cartridge is guided to a predetermined mounting position by guide grooves and projections, and is held at that position. A suitable combination of shapes and lengths of the guide protrusions and grooves prevents the compact memory cartridge with incorrect settings of its top and bottom surfaces or its right and left sides from being mounted on the adapter. The adapter is provided with a lock mechanism which prevents the compact memory cartridges from being detached from the adapter.

31 Claims, 14 Drawing Sheets

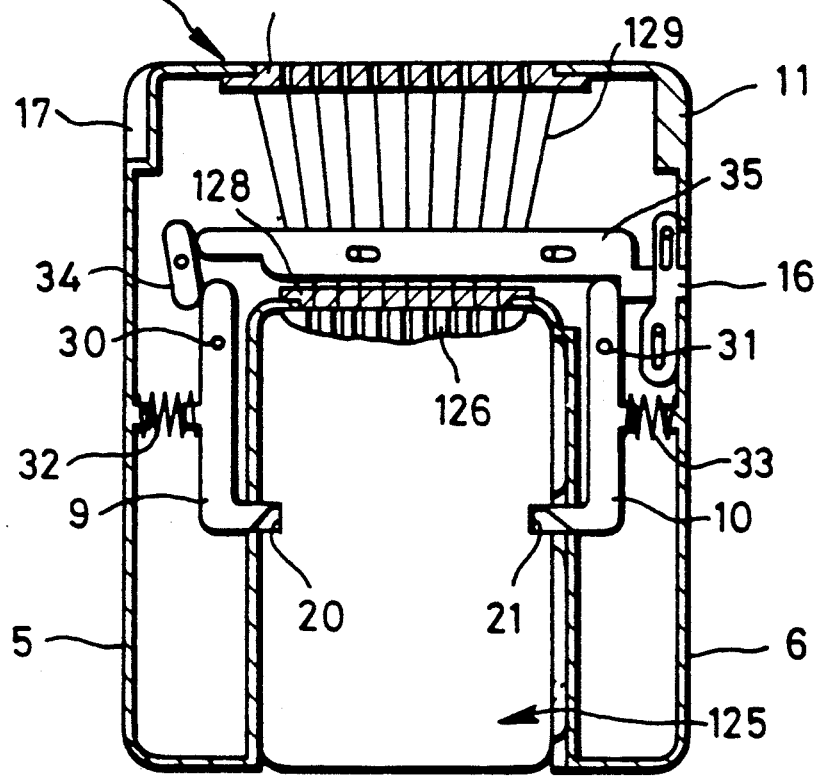
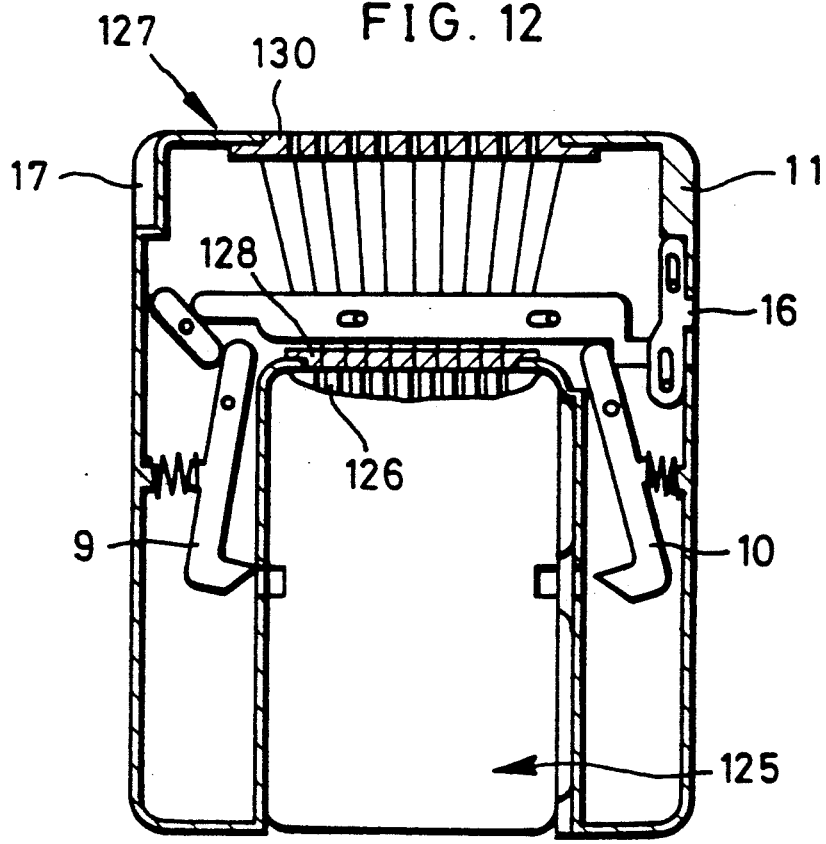

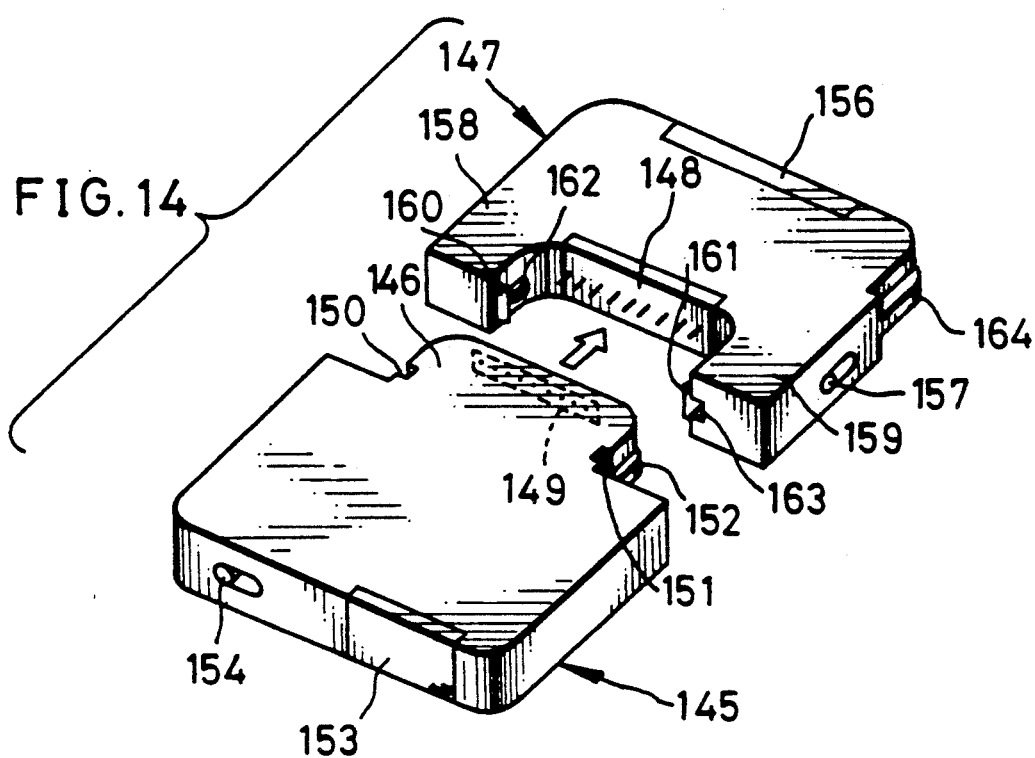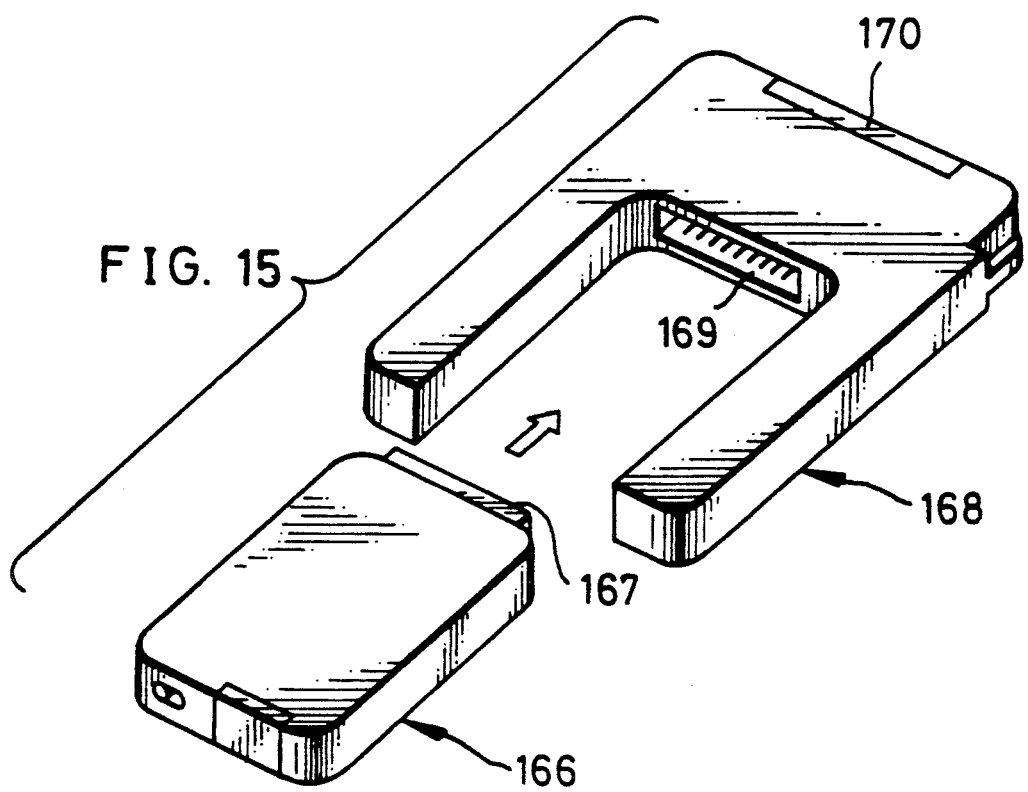

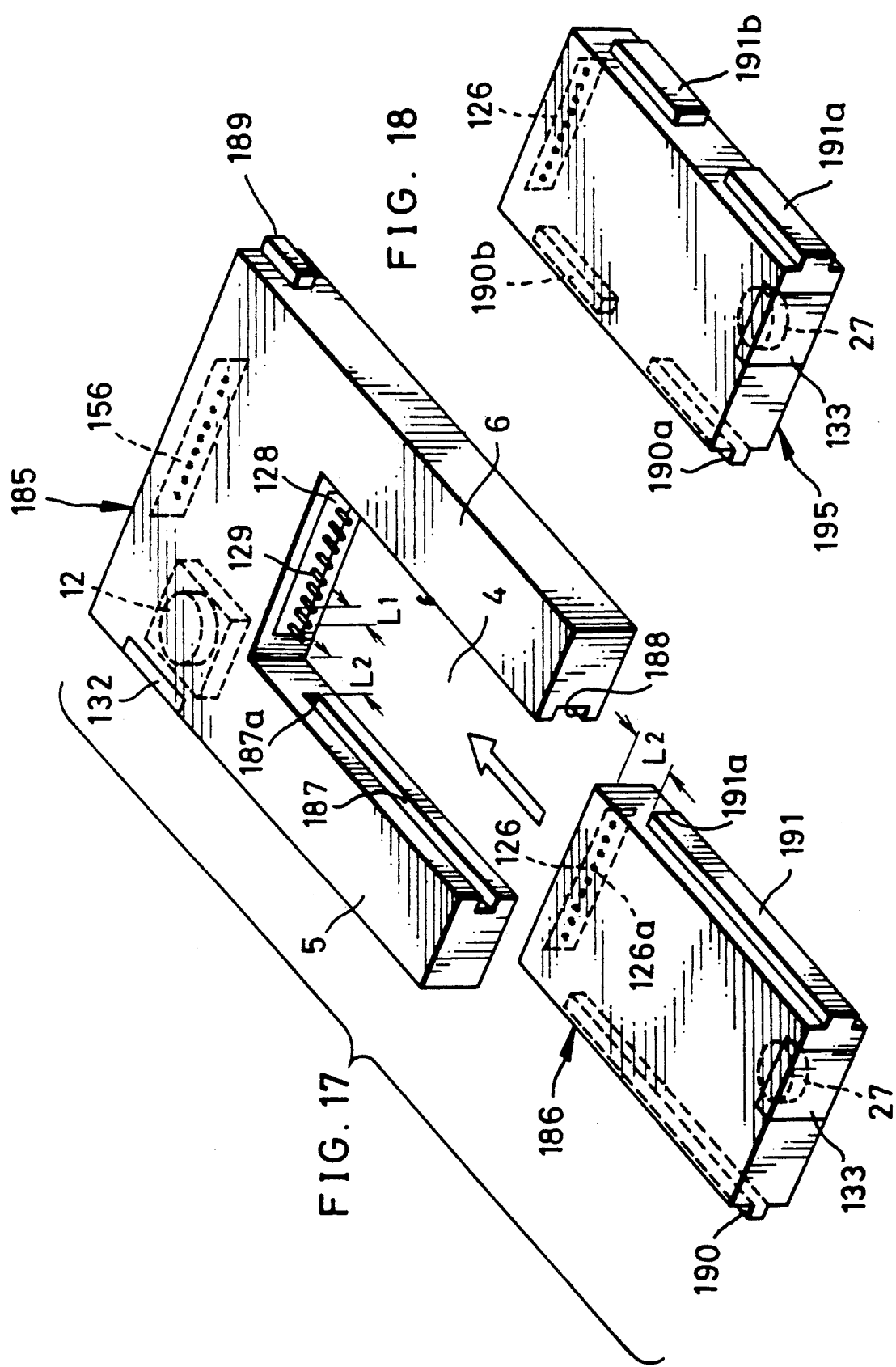

MEMORY CARTRIDGE SYSTEM WITH ADAPTER

BACKGROUND OF THE INVENTION

The present invention relates to a memory cartridge system having an adapter and a memory cartridge, and more particularly to a system used to load a memory cartridge into a reproducing apparatus.

An electronic still camera, which has been available, has a built-in image sensor to take an image of a subject and record analog video signals of the subject in a video floppy. By mounting the video floppy in a reproducing apparatus, images recorded in the video floppy can be viewed on a home television set. Further, by connecting a video printer to the reproducing apparatus, a hard copy of a recorded video image can be made.

Memory cartridges for IC cards, LSI cards and the like are used as an external memory of an electronic apparatus to write digital data therein or read it therefrom. In order to improve the quality of video image, an electronic still camera using a memory cartridge in place of a video floppy has been proposed recently. When a memory cartridge is loaded within a cartridge loading chamber of such a reproducing apparatus, a female connector of the memory cartridge is connected to a male connector mounted within the loading chamber.

It has been desired generally for an electronic still camera to use a small, compact or mini memory cartridge for improved portability and operability. However, this compact memory cartridge cannot be loaded within a reproducing apparatus designed for use with a large sized memory cartridge (herein called a standard memory cartridge). Since two types of reproducing apparatuses are provided, one using a standard memory cartridge and the other using a compact memory cartridge, a user will encounter considerable inconvenience.

If the size of a compact memory cartridge is to be reduced through greater integration of a memory circuit, it is necessary to use a smaller connector than that of a standard memory cartridge. Such a smaller connector cannot be coupled to the connector of a reproducing apparatus.

SUMMARY OF THE INVENTION

In view of the foregoing, it is an object of the present invention to provide a memory cartridge system for loading a memory cartridge into a reproducing apparatus.

It is another object of the present invention to provide a memory cartridge system capable of allowing a memory cartridge to be still smaller, requiring a different type of connector from that of a standard memory cartridge.

It is a further object of the present invention to provide a memory cartridge system capable of preventing a memory cartridge from being loaded incorrectly, with its bottom and top or right and left sides reversed.

It is a still further object of the present invention to provide a memory cartridge system capable of preventing an accident in which either the adapter or the memory cartridge is left within a reproducing apparatus while a memory cartridge alone is removed from the reproducing apparatus.

In order to achieve the above and other objects of this invention, a memory cartridge system has an adapter and a memory cartridge, the adapter being arranged such that the overall shape and dimension of an adapter with the memory cartridge being mounted thereon is substantially the same as those of a standard memory cartridge. According to a preferred embodiment of this invention, the adapter is provided with a second connector to be coupled to a first connector of a compact memory cartridge, and a third connector electrically connected to the second connector and to be coupled to a fourth connector of a reproducing apparatus normally using a standard memory cartridge. According to a further preferred embodiment, guide means are provided for regulating the state of a compact memory cartridge to be inserted correctly into the adapter. According to a still further preferred embodiment of this invention, lock means are provided in order to prevent a compact memory cartridge from being detached easily from the adapter body.

BRIEF DESCRIPTION OF THE DRAWINGS

The above and other objects and advantages of the present invention will become apparent to those skilled in this art from the following detailed description of the invention when read in connection with the accompanying drawings, in which:

FIGS. 11 and 12 are cross sections of a compact memory cartridge mounted on the adapter shown in FIG.

FIGS. 13 to 16 are perspective views of adapters each provided with a connector, and compact memory cartridges, according to other embodiments of this invention;

FIG. 17 is a perspective view of an adapter and a compact memory cartridge according to an embodiment of this invention, wherein, if the compact memory cartridge is pushed into the adapter with its top and bottom surfaces being reversed, it is prevented from being guided thereinto;

FIG. 18 is a perspective view of a compact memory cartridge to be guided into the adapter shown in FIG. 17, according to another embodiment of this invention;

DETAILED DESCRIPTION OF THE PREFERRED EMBODIMENT

Figure 1:
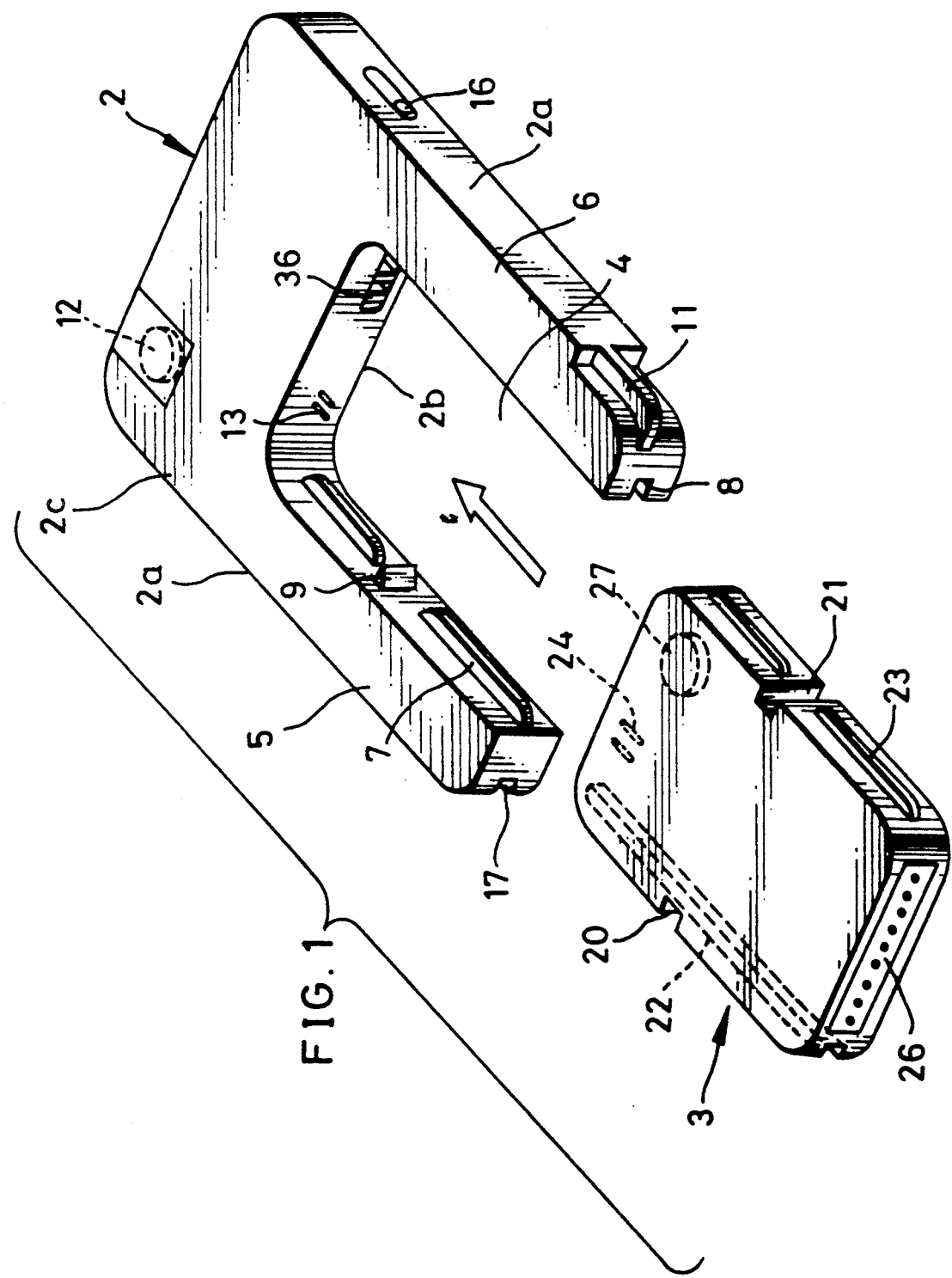
FIG. 1 is a perspective view of a compact memory cartridge and an adapter according to a preferred embodiment of this invention.
Figure 2:
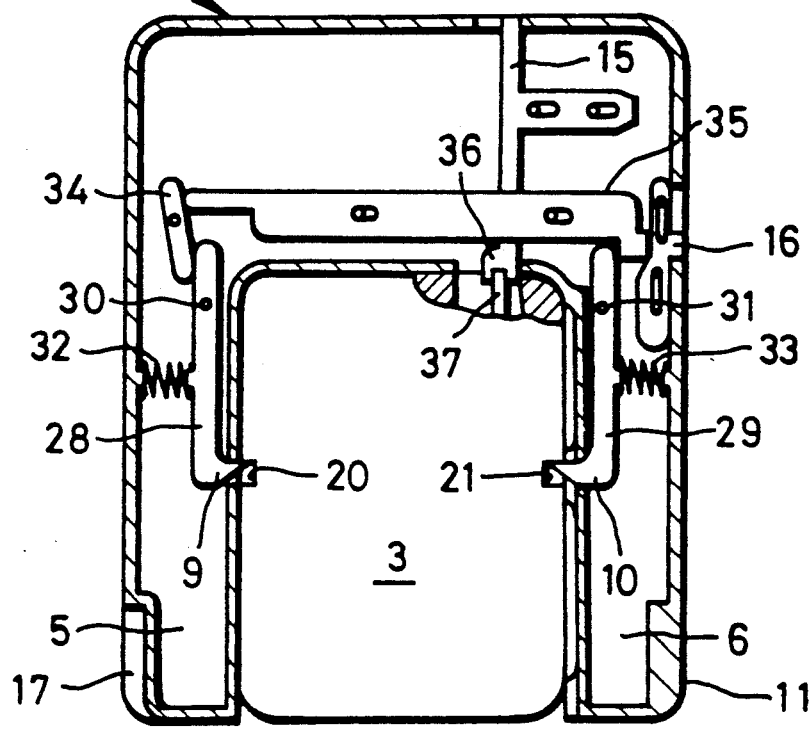
FIGS. 2 and 3 are cross sections of a compact memory cartridge mounted on the adapter shown in FIG. 1.
Figure 3:
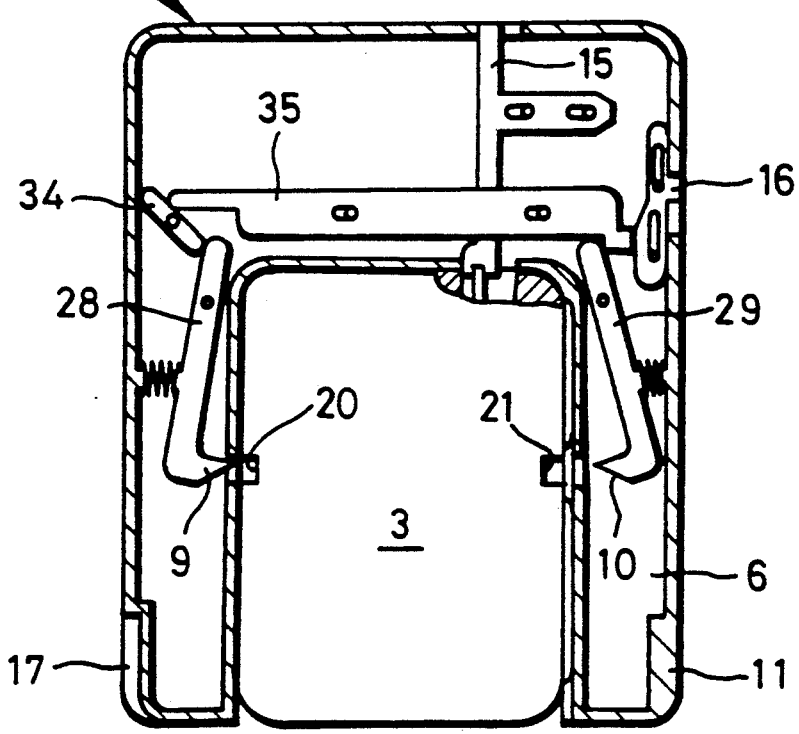
Figure 4:
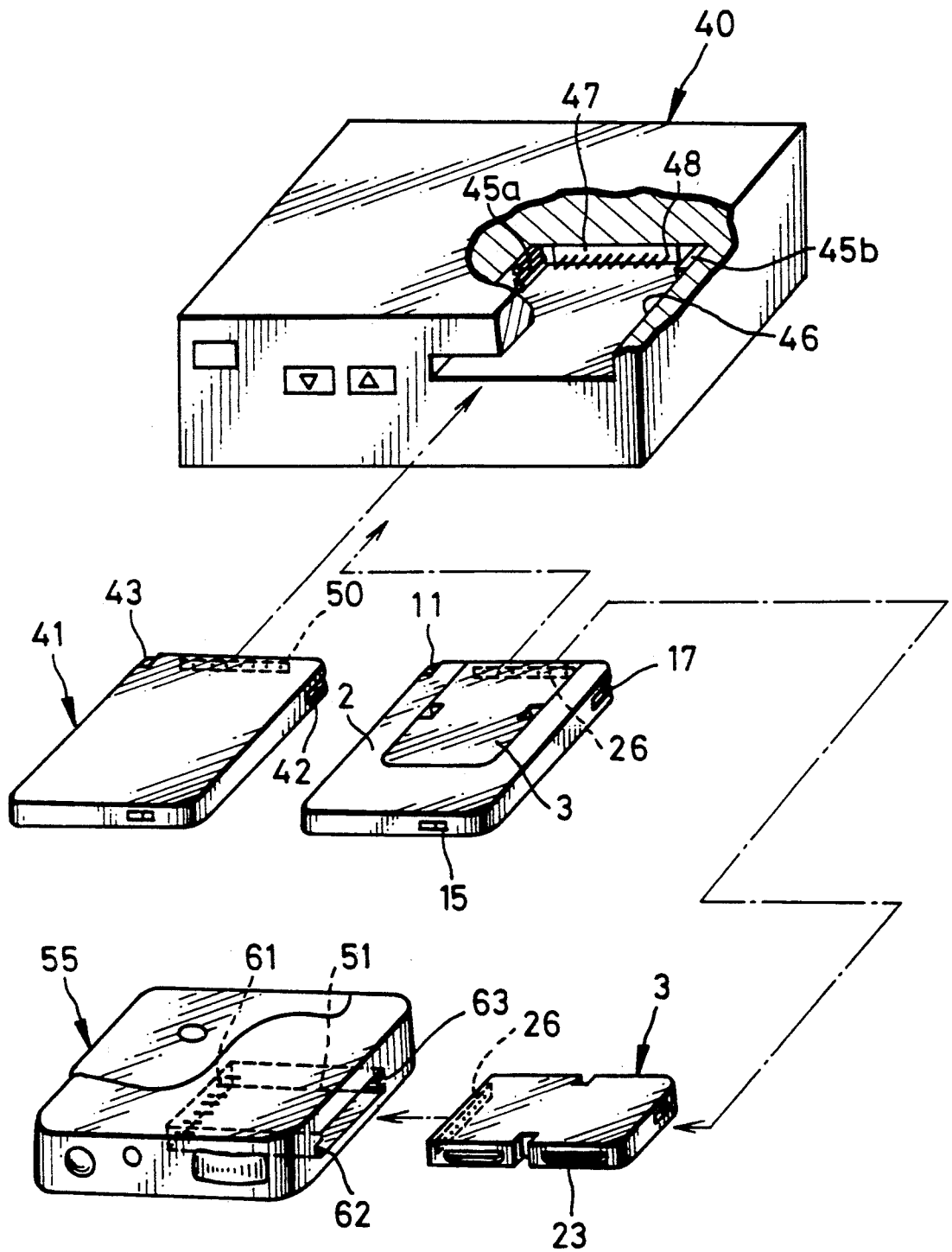
FIG. 4 illustrates a system arrangement showing how a compact memory cartridge is used.

Referring to FIGS. 1 to 3 showing a memory cartridge system having a compact memory cartridge 3 and an adapter 2, the adapter 2 is formed with a pair of arms 5 and 6 integrally with the adapter body, and is configured generally in a U shape in a plan view. This adapter 2 has a thickness substantially the same as that of a compact memory cartridge 3 which is inserted within a space 4 between the arms 5 and 6 in the direction indicated by an arrow, resulting in an adapter/cartridge combination having the same shape and size as a larger, standard memory cartridge 41 (FIG. 4). Opposite sides 2a, bottom surface 2b and top surface 2c of the adapter 2 with the compact memory cartridge 3 being mounted therein come into sliding contact with the inner walls of a loading chamber of a reproducing apparatus 40 (FIG. 4) designed for the standard memory cartridge 41. In this embodiment, the compact memory cartridge 3 has the same thickness as the standard memory cartridge 41, but may be made thinner than the standard memory cartridge 41.

Two guide protrusions 7 are provided on an inner side wall of the arm 5. A guide groove 8 is provided in an inner side wall of the arm 6. The guide protrusions 7 and guide groove 8 come into engagement with a guide groove and guide protrusions, respectively, of the compact memory cartridge 3 to be described later, for regulating the position of the compact memory cartridge 3 in the thickness direction with respect to the adapter 2. Since the guide members provided at the arms 5 and 6 have different shapes, the incorrect insertion of the compact memory cartridge 3 with its right and left side reversed can be prevented. An engagement claw 9 is provided between two guide protrusions 7, the claw 9 being capable of being retracted into and extended out of the arm 5. A similar engagement claw 10 (FIG. 2) also is provided for the arm 6. These engagement claws 9 and 10 engage recesses 20 and 21 formed in opposite sides of the compact memory cartridge 3, so that the cartridge 3 is prevented from being removed easily from the adapter 2. With such an arrangement, the compact memory cartridge 3 will not be left within a reproducing apparatus 40 when the adapter 2 is pulled out.

A protrusion 11 and a groove 17 are formed at the end portions on opposite outer sides of the arms 5 and 6. The protrusion 11 and groove 17 serve to prevent incorrect insertion, including a reversal of top and bottom surfaces and right and left sides, of the adapter 2 holding the compact memory cartridge 3.

The adapter 2 contains a battery 12 with a rather large capacity which is replaced with a new battery when necessary. This battery 12 is connected via connection or terminal pins 13 to a memory circuit (not shown) of the compact memory cartridge 3 to back it up. On the upper right side of the adapter 2, there is mounted a slidable write protect lever 15 (FIG. 2) which couples with a write protect knob 37 of the compact memory cartridge 3 when the compact memory cartridge 3 is mounted on the adapter 2. A lock release knob 16 is mounted on one side of the adapter 2 for releasing a lock by the engagement claws 9 and 10.

A groove 22 and protrusions 23 are formed on respective opposite sides of the compact memory cartridge 3, for engagement with the guide protrusions 7 and the guide groove 8 of the adapter 2. At the back end of the compact memory cartridge 3, there are provided a pair of terminal holes 24 into which the terminal pins 13 are inserted. At the front end of the compact memory cartridge 3, a female connector 26 having a number of terminal holes is mounted. When this female connector 26 is mated with a male connector 47 (FIG. 4) of the reproducing apparatus 40, the reproducing apparatus 40 can read or write image data into or from the compact memory cartridge 3. A battery 27 backs up the memory circuit of the compact memory cartridge 3.

The engagement claws 9 and 10 are rotatably mounted about pins 30 and 31 within the arms 5 and 6, and are biased by springs 32 and 33. One end of the engaging claw 9 is in contact with a rotatable lever 34. A slide arm 35 also is provided to pivot the engagement claw 10 and the rotatable lever 34, the slide arm 35 being moved by the lock release knob 16. This slide arm 35 is mounted within the adapter 2, and is slidable in the right and left directions by means of pins and slots. One end of the write protect lever 15 extends from the upper end of the adapter 2, the other end forming a bifurcated portion 36 coupled with the write protect knob 37.

Next, the operation of this embodiment will be described. In mounting the compact memory cartridge 3 on the adapter 2, the compact memory cartridge 3 is directed toward the space 4 while positioning the female connector 26 at the outer side, and then is pushed and inserted between the arms 5 and 6 while putting the groove 22 and protrusions 23 into engagement with the corresponding guide protrusions 7 and guide groove 8. When the compact memory cartridge 3 is completely pushed in between the arms 5 and 6, the engagement claws 9 and 10 come into engagement with the recesses 20 and 21, and the terminal pins 13 are inserted into the terminal holes 24. When the terminal pins 13 are coupled with the terminal holes 24, the back-up power supply for the compact memory cartridge 3 is switched from the battery 27 to the battery 12 so as not to consume the battery 27. Since the opposite sides of the compact memory cartridge 3 have different shapes, the cartridge 3 cannot be inserted into the adapter 2 with the right and left sides reversed. Thus, the dimension of the adapter 2 with the compact memory cartridge 3 mounted thereon becomes the same as the standard memory cartridge 41.

In removing the compact memory cartridge 3 from the adapter 2, the lock release knob 16 is slid to the position shown in FIG. 3. As a result, the slide arm 35 is moved to the left, and the engagement claw 10 is rotated counterclockwise while the engagement claw 9 is rotated clockwise. These engagement claws 9 and 10 rotate against the forces of the springs 32 and 33 to get out of the recesses 20 and 21. In this condition, the cartridge 3 can be removed from the adapter 2 when the cartridge 3 is moved in the direction opposite that shown by the arrow in FIG. 1.

FIG. 4 shows how a memory cartridge system is used. In FIG. 4, a standard memory cartridge also is shown for the sake of reference. As described previously, the standard memory cartridge has the same shape and dimension as the adapter 2 with the compact memory cartridge 3 mounted therein. Similar to the adapter 2, the standard memory cartridge 41 is formed with a groove 42 and a protrusion 43.

This standard memory cartridge 41 is loaded in a standard type electronic still camera (not shown), and image data of recorded scenes is written in a memory circuit. After taking scenes with the electronic still camera, the standard memory cartridge 41 is mounted on a reproducing apparatus 40 to read stored image data. The read-out image data can be displayed on a home television set connected to the reproducing apparatus, or transformed into a hard copy by means of a video printer connected to the reproducing apparatus 40. At the head of the standard memory cartridge 41, there is mounted a female connector 50 having a number of terminal holes, the connector 50 having the same structure as the female connector 26 mounted on the compact memory cartridge 3.

The reproducing apparatus 40 has a loading chamber 46 within which the standard memory cartridge 41 is housed. The width and height of the loading chamber 46 are substantially the same as the standard memory cartridge 41. The depth of the loading chamber 46 is shorter than the length of the standard memory cartridge 41 so that when it is housed within the loading chamber 46, the bottom end thereof extends out of the chamber 46. By holding and pulling the bottom end of the standard memory cartridge 41 with one's fingers, the cartridge 41 it can be ejected from the loading chamber 46. At the bottom of the loading chamber 46, there is mounted a male connector 47 which can be coupled to the female connector 50 of the standard memory cartridge 41, the male connector 47 also having a plurality of terminal pins 48. On opposite sides at the bottom of the loading chamber 46, there are formed an engaging member 45a and a protrusion 45b adapted to be engaged with the protrusion 43 and the groove 42 of the standard memory cartridge 41, respectively. Since the shapes of both lateral ends of the loading chamber 46 at the bottom thereof are different, if the standard memory cartridge 41 is inserted into the loading chamber with its top and bottom surfaces or right and left sides being reversed, the head of the standard memory cartridge 41 will not reach the bottom end of the loading chamber, but it is stopped in the middle of insertion. Therefore, the terminal pins 48 of the male connector 47 are prevented from being bent by the standard memory cartridge 41.

In many cases, the compact memory cartridge 3, which is smaller in dimension than the standard memory cartridge 41, is loaded into the electronic still camera 55 in order to make the camera compact and light. A loading chamber 51 of the electronic still camera 55 has a size substantially the same as that of the compact memory cartridge 3. At the bottom of the loading chamber 51, there is mounted a male connector 61 which is coupled to the female connector 26 of the compact memory cartridge 3. A guide groove 62 and a guide protrusion 63, provided on the side walls of the loading chamber 51, are engaged with the protrusions 23 and the groove 22 of the compact memory cartridge 3, so as to prevent erroneous loading of the compact memory cartridge 3. While taking scenes with the electronic still camera 55 with the compact memory cartridge 3 loaded therein, video signals of the scenes are subjected to image and digital conversion processing, so as to be written as image data in a memory circuit of the compact memory cartridge 3. The end of the compact memory cartridge 3 is exposed from the electric still camera 55 so that the write protect knob 37 can be operated to select one of a write enabled mode and a write inhibited mode.

In reproducing each video image written in the compact memory cartridge 3, the compact memory cartridge 3 is mounted on the adapter 2, as described previously. The shape and size of the adapter 2 with the compact memory cartridge 3 mounted thereon are the same as those of the standard memory cartridge 41. As a result, similar to the case of the standard memory cartridge 41, the compact memory cartridge 3 can be housed correctly within the loading chamber 46. When the adapter 2 is mounted correctly on the reproducing apparatus 40, the end of the adapter 2 extends from the loading chamber 46, and the write protect lever 15 is exposed outside the loading chamber 46. Therefore, while the adapter 2 is mounted on the reproducing apparatus 40, it is possible to select an image data write enable mode or an image data write inhibited mode. In detaching the compact memory cartridge 3 from the reproducing apparatus 40, the end of the adapter 2 extending out of the loading chamber is held with fingers and pulled backward so that the adapter 2 along with the compact memory cartridge 3 can be removed from the loading chamber 46. Since the lock release knob 16 is within the loading chamber 46, there is no fear that the lock release knob 16 will be actuated while the adapter 2 is removed, or that the compact memory cartridge 3 will be left within the loading chamber 46.

By using the adapter 2, the compact memory cartridge 3 can be mounted on an electronic still camera designed for a standard memory cartridge 41. In this case also, since the end of the adapter 2 extends out of the loading chamber of the electronic still camera, the write protect knob 37 of the compact memory cartridge 3 can be actuated by the write protect lever 15 while it is mounted on the electronic still camera.

Figure 5:
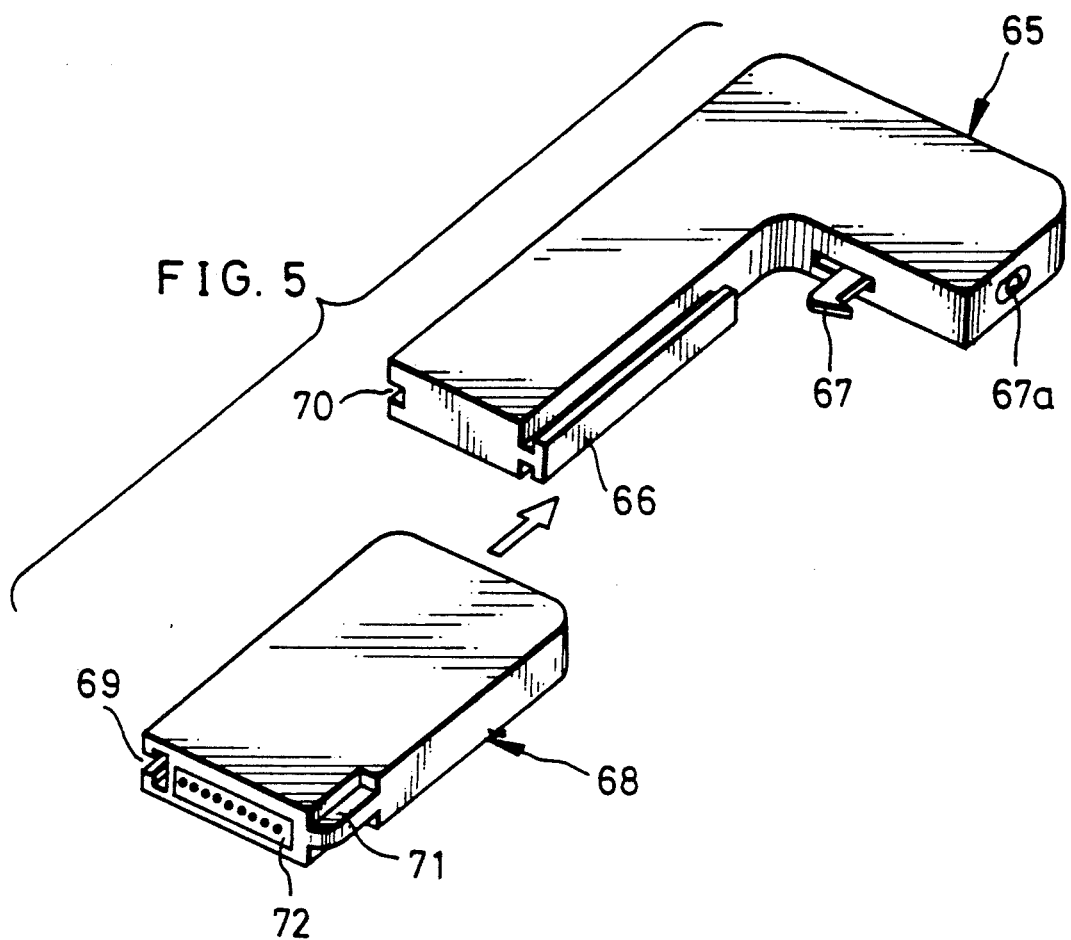
FIGS. 5 to 9 are perspective views of adapters and compact memory cartridges according to other embodiments.

FIG. 5 shows another embodiment of the memory cartridge system. An adapter 65 is configured in an L shape. The shape and size of the adapter 65 with a compact memory cartridge 68 being mounted thereon are the same as those of the standard memory cartridge 41. The adapter 65 is provided with a T-shaped guide protrusion 66, a hook 67, and a groove 70. On the other hand, the compact memory cartridge 68 is provided with a T-shaped groove 69 for engagement with the guide protrusion 66, an engagement hole (not shown) for engagement with the hook 67, and a protrusion 71. As the compact memory cartridge 68 is guided to the adapter 65 in the direction indicated by an arrow, the groove 69 comes into engagement with the protrusion 66 so that the compact memory cartridge 68 is held securely by the adapter 65. Thereafter, the hook 67 enters the engagement hole to lock the compact memory cartridge 68 in place. This hook 67 is formed integrally with a release knob 67a. When the release knob 67a is depressed, the hook 67 moves to release the engagement with the compact memory cartridge 68.

In this embodiment, when the compact memory cartridge 68 is mounted on the adapter 65, the female connector 72 is located at one side of the adapter 65. The result is a reproducing apparatus whose male connector is displaced correspondingly.

Figure 6:
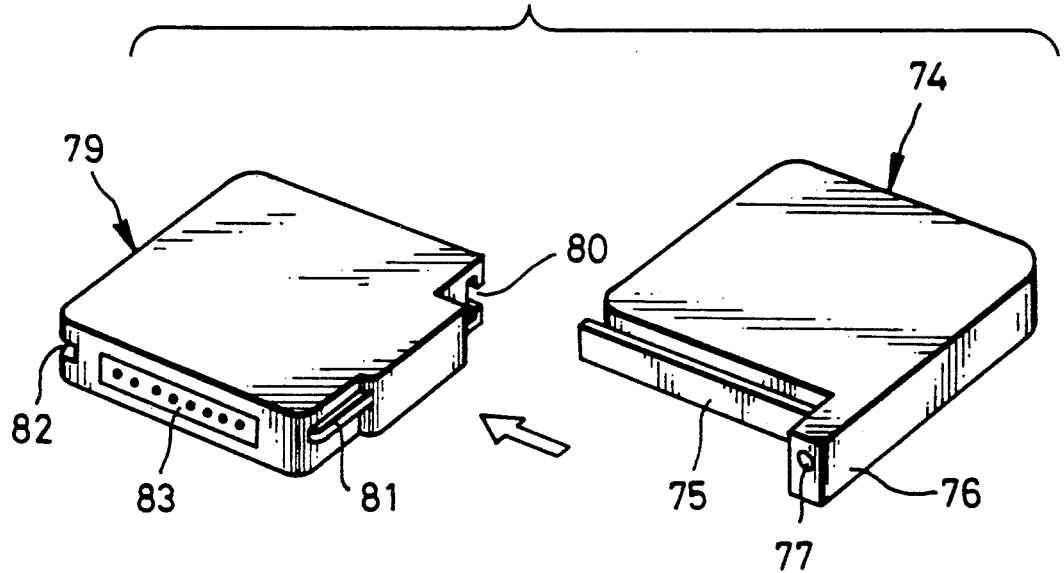

FIG. 6 shows a further embodiment of the memory cartridge system. A compact memory cartridge 74 of this embodiment has the same width and thickness as the standard memory cartridge 41, and a shorter length. On the front surface of the adapter 74, there is formed a T-shaped guide protrusion 75, and a projection 76 at one side thereof. This projection 76 is provided with a known click ball 77. The compact memory cartridge 79 on the other hand is provided with a T-shaped groove 80 adapted to engage with the guide protrusion 75, a protrusion 81 and a groove 82 for controlling the insertion thereof into a reproducing apparatus 40, and a female connector 83.

The adapter 74 constructed in this fashion is slid into the compact memory cartridge 79 in the direction indicated by an arrow. The compact memory cartridge 79 is held in position by the click ball 77 so as not to be detached from the adapter 74. In this embodiment, since the guide protrusion 75 extends in a direction perpendicular to the direction of insertion of the adapter into the reproducing apparatus 40, the compact memory cartridge 79 will not be detached from the adapter 74 or left within the reproducing apparatus 40, even if no lock mechanism is provided.

Figure 7:
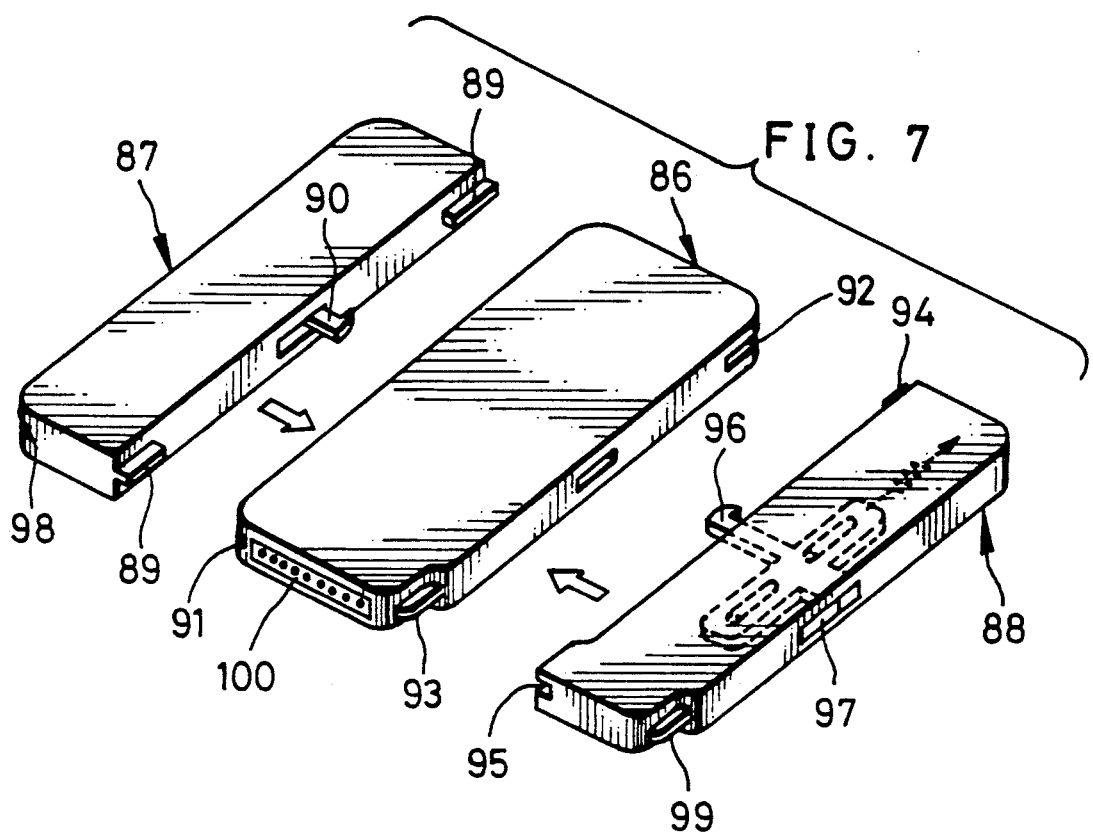

FIG. 7 shows a memory cartridge system in which an adapter is mounted on a compact memory cartridge having the same thickness and length as those of the standard memory cartridge, but a narrower width. The adapters 87 and 88 are coupled to the compact memory cartridge 86 at opposite sides thereof. The shape and dimension in this state are the same as those of the standard memory cartridge 41. The adapter 88 is provided with a protrusion 94 and a groove 95 respectively adapted to engage with a groove 92 and a protrusion 93 of the compact memory cartridge 86, and a hook 96. This hook 96 moves against the spring force to release the engagement with the compact memory cartridge 86 when a lever 97 is actuated. The adapter 87 is provided with two positioning protrusions 89 adapted to engage with a pair of grooves 91 formed on the compact memory cartridge 86, and a hook 90 adapted to engage with the compact memory cartridge 86. When pushed in the directions indicated by the arrows, these adapters 87 and 88 are coupled fixedly to the compact memory cartridge 86 at opposite sides thereof. A groove 98 and a protrusion 99 are provided for preventing erroneous loading of the adapters into the reproducing apparatus 40. Reference numeral 100 represents a female connector.

Figure 8:
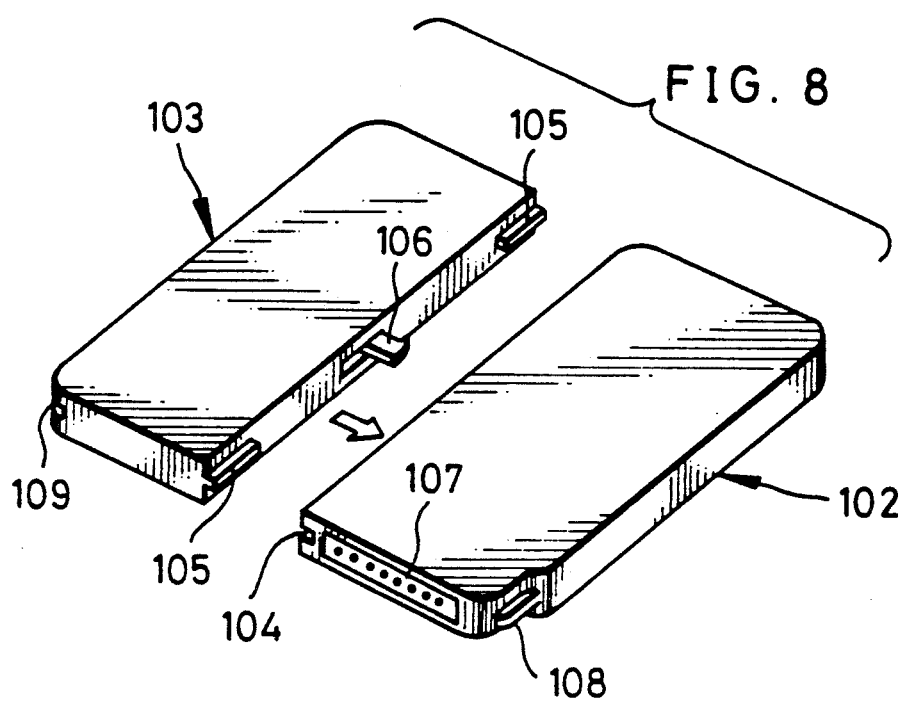

FIG. 8 shows an embodiment wherein an adapter 103 is coupled to a compact memory cartridge 102 at only one side thereof. The adapter 103 is provided with two protrusions 105 adapted to engage with grooves 104 formed at opposite end portions of one side of the compact memory cartridge 102, and a hook 106. In this embodiment, since a connector 107 of the compact memory cartridge 102 is located to one side, this adapter is used for a similar reproducing apparatus as described with respect to the embodiment shown in FIG. 5. A protrusion 108 and a groove 109 are provided for preventing erroneous loading of the adapter into the reproducing apparatus 40.

Figure 9:
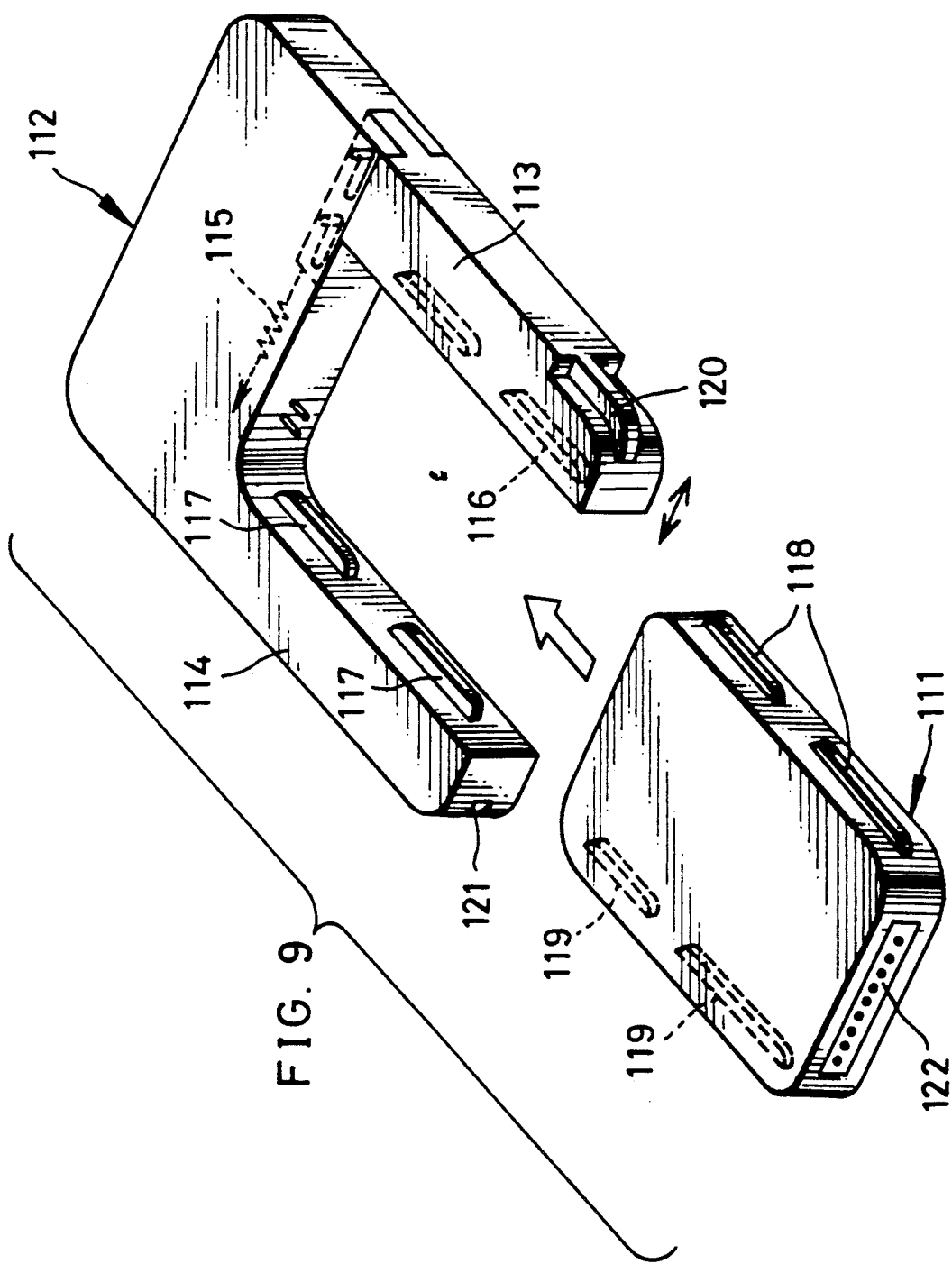

FIG. 9 shows an embodiment wherein an adapter 112 clamps a compact memory cartridge by means of a slidable or movable arm 113 and a fixed arm 114. The movable arm 113, provided with two grooves 116, is biased toward the fixed arm 114 by a spring 115. The fixed arm 114 is provided with a pair of protrusions 117. The compact memory cartridge 111 is provided with protrusions 118 adapted to engage with the grooves 116 of the movable arm 113. As the compact memory cartridge 111 is guided within the adapter 112, the movable arm 113 is forced to retract against the force of the spring 115 so as to elongate the distance to the fixed arm 114. When the compact memory cartridge 111 reaches the predetermined set position, the movable arm 113 goes back to engage the grooves 116 with the protrusions 118 of the compact memory cartridge 111. At the same time, the grooves 119 of the compact memory cartridge 111 come into engagement with the protrusions 117 of the fixed arm 114. In this condition, the compact memory cartridge 111 is squeezed by a pair of arms 113 and 114 so as not to be detached from the adapter 112. This squeezing force should be set larger than the coupling force between a female connector 122 and the male connector 47, so that the compact memory cartridge 111 will not be detached from the adapter 112. Reference numeral 120 represents a protrusion, and 121 a groove.

In each of the above embodiments, the female connector of the compact memory cartridge has the same structure as that of the standard memory cartridge so enable direct electrical connection of the compact memory cartridge to the reproducing apparatus. In the meantime, the smaller a compact memory cartridge is made as a memory circuit is highly integrated, the smaller a female connector will be in practical use. In such a case, in each of the above embodiments, the female connector of the compact memory cartridge cannot be coupled to the male connector of the reproducing apparatus.

Figure 10:
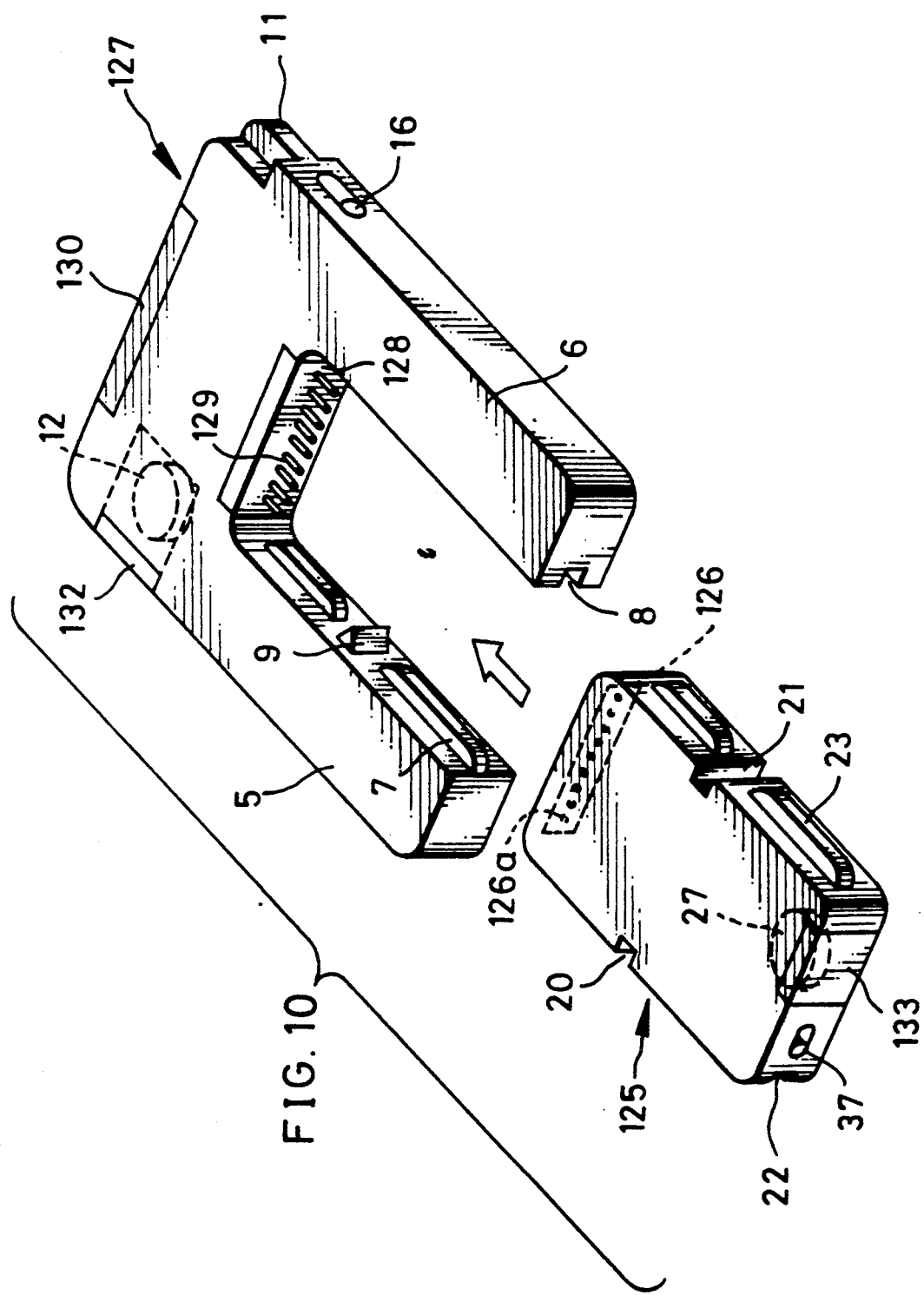
FIG. 10 is a perspective view of an adapter with a connector and a compact memory cartridge according to another embodiment.

In an embodiment shown in FIGS. 10 to 12, a compact memory cartridge having a small female connector is arranged to be connectable electrically to a reproducing apparatus. In FIGS. 10 to 12, elements similar to those shown in FIGS. 1 to 3 are represented by using identical reference numerals. A compact memory cartridge 125 is provided with a female connector 126 having a number of terminal holes 126a. The size of the female connector 126 is different from that of the female connector 50 of the standard memory cartridge 41. This female connector 126 is coupled to a male connector 128 having a number of terminal pins 129 mounted on the inner wall of an adapter 127. This male connector 128 is connected via lead wires 129 to a female connector 130 which is of the same type as the female connector 50 Of the standard memory cartridge 3. Reference numerals 132 and 133 represent lids for the battery spaces.

When the compact memory cartridge 125 with its female connector 126 directed to the adapter 127 is mounted on the adapter 127, the female connector 126 is coupled with the male connector 128. If the compact memory cartridge 125 is used with the reproducing apparatus 40 shown in FIG. 4, the adapter 127 along with the compact memory cartridge 125 is loaded within the loading chamber 46 while directing the female connector 130 toward the loading chamber 46. Upon completion of loading, the female connector 130 has been coupled to the male connector 47 of the reproducing apparatus 40. In this manner, the compact memory cartridge 125 can be connected electrically to the reproducing apparatus 40 via the adapter 127.

Figure 13:
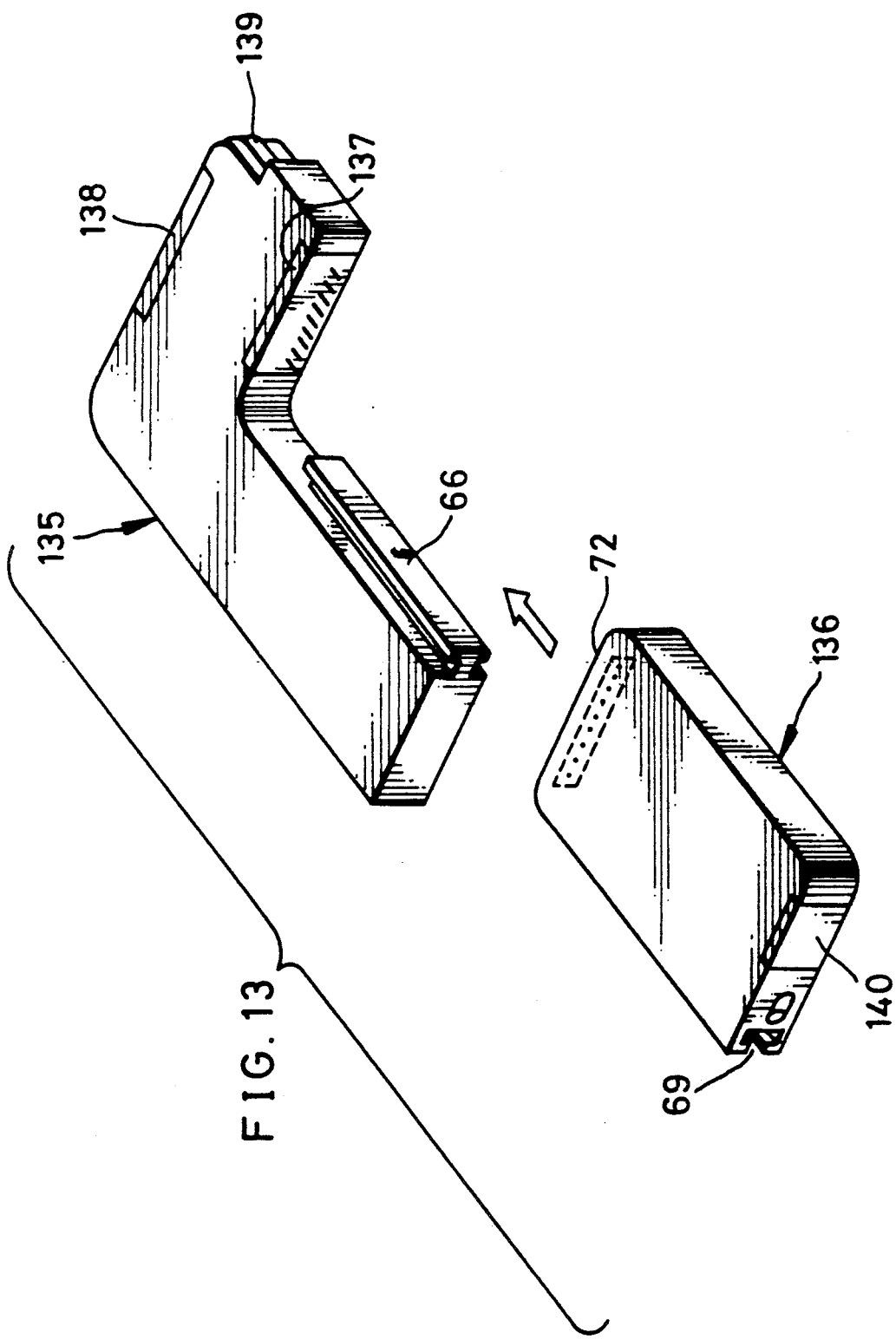

FIG. 13 shows a memory cartridge system having an L-shaped adapter. This adapter 135 is similar to the adapter 65 shown in FIG. 5, with like elements being represented by identical reference numerals. The adapter 135 is provided with a male connector 137 to be coupled to a female connector 72 of a compact memory cartridge 136, and a female connector 138 of the same type as the female connector 50 of a standard memory cartridge 41. Reference numeral 139 represents a positioning protrusion, and reference numeral 140 represents a lid for a battery space. Also, in this embodiment, the adapter 135 is loaded within the reproducing apparatus, with the female connector 138 being directed toward the reproducing apparatus.

FIG. 14 shows an embodiment wherein, if a compact memory cartridge with the right and left sides or top and bottom reversed is pushed into the adapter, it is stopped at the middle of insertion. This compact memory cartridge 145 has the same width and thickness as the standard memory cartridge 41, and a shorter length. In order to supplement this shortened length, an adapter 147 is fitted to the compact memory cartridge 145. A male connector is mounted at the tip of the extended portion 146 of the compact memory cartridge 145, for coupling to a female connector 148 of the adapter 147. Recesses 150 and 151 are formed on opposite sides of this extended portion 146. A groove (not shown) is formed on the side of the recess 150, and a protrusion 152 is formed on the side of the recess 151. Reference numeral 153 represents a lid for a battery space, and reference numeral 154 represents a write protect knob.

The adapter 147 is provided with a female connector 156 of the same type as the female connector of the standard memory cartridge. The female connector 156 is connected electrically to a male connector 148. Engagement claws 160 and 161 are formed at the distal end portions of arms 158 and 159 of the adapter 147, for engagement with the recesses 150 and 151. These engagement claws 160 and 161 are unlocked by a lock release knob 157 provided at the side wall of the adapter 147. A protrusion 162, for engagement with the groove of the compact memory cartridge 145, is formed on the arm 158, and a guide groove 163, for engagement with the protrusion 152, is formed on the arm 159. Reference numeral 164 represents a protrusion adapted to engage with the guide groove 45a of the reproducing apparatus 40.

In an embodiment shown in FIG. 15, a compact memory cartridge 166 is provided with a protruded female connector 167 which is inserted into a hole defined by a male connector 169 of an adapter 168. This engagement between both the connectors 167 and 169 provides a cantilever support of the compact memory cartridge 166 by the adapter 168. A female connector 170 to be coupled to the connector 47 of the reproducing apparatus 40 is connected electrically to the male connector 169. It is preferable to provide the above-described guide means and lock mechanism also in the present embodiment.

Figure 16:
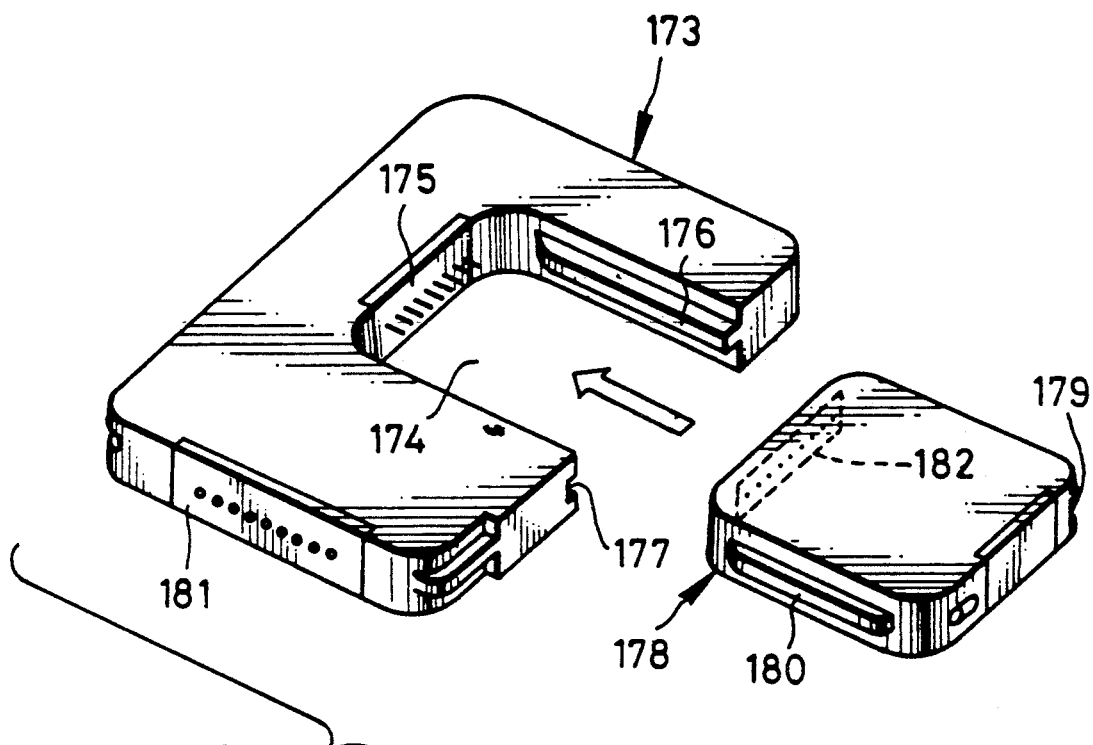

An adapter 173 shown in FIG. 16 is formed with a generally rectangular recess 174 opening to one side of the adapter 173. A male connector is mounted at a bottom of the recess 174, for electrical connection to a female connector 181. A guide protrusion 176 and a guide groove 177, extending in a direction of insertion of a compact memory cartridge 178, are formed on opposite inner walls of the recess 174. This compact memory cartridge 178 is provided with a groove 179 for engagement with the guide protrusion 176, and a protrusion 180 for engagement with the guide groove 177. Into this adapter 173 constructed as above, the compact memory cartridge 178 is guided into the recess 174 in the direction indicated by an arrow. Reference numeral 182 represents a female connector. Since the direction of guiding the compact memory cartridge 178 is perpendicular to the direction of loading the adapter 173 into the reproducing apparatus 40, it is not necessary to provide a lock mechanism for locking the compact memory cartridge 178 to the adapter 173, thereby reducing manufacturing cost.

In the above-described embodiments except that shown in FIG. 14, if a compact memory cartridge is guided into the adapter with its right and left sides correctly set, it could be loaded into the adapter, even if the top and bottom are not correctly set. In such a case, the connector of the adapter may be broken by the back surface of the compact memory cartridge. In an embodiment shown in FIG. 17, if a compact memory cartridge with its right and left sides or top and bottom being reversed is pushed into an adapter, it is stopped in mid-insertion. In FIG. 17, elements similar to those of the embodiment shown in FIG. 10 are represented by using identical reference numerals. To prevent the compact memory cartridge 186 from being guided with its right and left sides reversed, the width of a guide groove 187 of an arm 5 is determined to be wider than that of a guide groove 188 of an arm 6. The guide groove 187 does not extend up to the bottom of a recess, a distance L2 being set between the end 187a of the groove 187 and the bottom of the recess being flush with a male connector 128. This distance L2 is longer than the length L1 of a terminal pin 129 of the male connector 128. The guide groove 188 is formed similarly. Reference numeral 189 represents a protrusion for regulating the direction of guidance.

The compact memory cartridge 186 is provided with a protrusion 190 adapted to engage with the guide groove 187, and a protrusion 191 adapted to engage with the guide groove 188, respectively at opposite side walls of the cartridge 186. The distance between the end 191a of the protrusion 191 and the surface of a female connector 126 is set to L2. Under the setting conditions of the compact memory cartridge 186 as shown in FIG. 17, the compact memory cartridge 186 can be mounted on the adapter 185 such that the female connector 126 is coupled reliably to the male connector 128. However, if the compact memory cartridge 186 with its right and left sides reversed is intended to be guided, it cannot be inserted into the recess 4 of the adapter 185 because of different widths of the guide grooves 187 and 188. Furthermore, if the compact memory cartridge 186 is guided correctly setting its right and left sides but incorrectly setting its top and bottom surfaces, i.e., if the cartridge is guided while directing the battery lid 133 toward the recess 4, the surface of the battery lid 133 is guided only to the position spaced by the distance L2 from the bottom of the recess. Therefore, the surface of the battery lid 133 will not abut the terminal pins 129 of the male connector 128 or will not break these terminal pins 129.

A compact memory cartridge 195 shown in FIG. 18 is provided with four separated guide protrusions 190a, 190b, 191a, and 191b. The operation and function of this embodiment are the same as the embodiment shown in FIG. 17.

Figure 19:
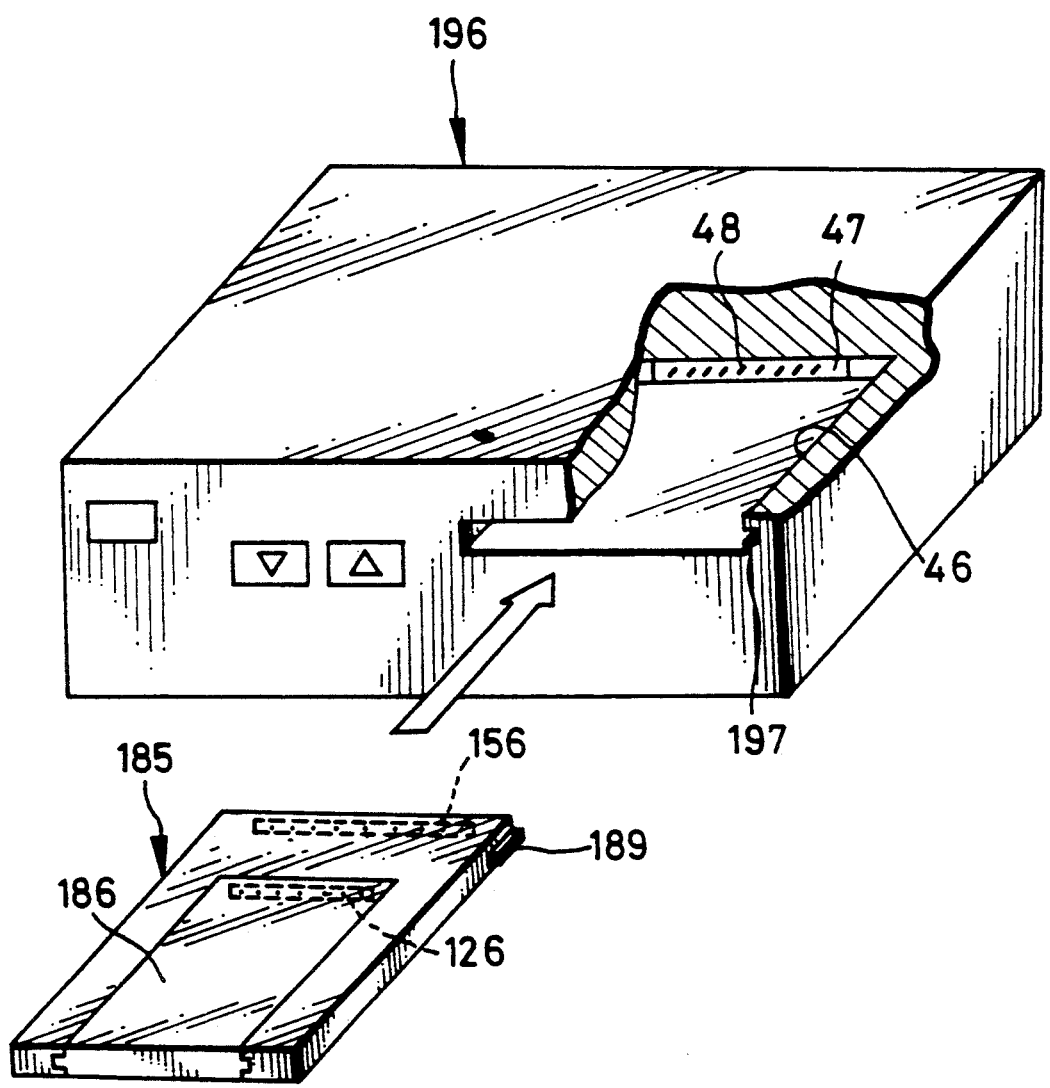
FIG. 19 is a perspective view of the memory cartridge system shown in FIG. 17, and a reproducing apparatus for loading the system.

FIG. 19 shows a reproducing apparatus used with the memory cartridge system shown in FIG. 17 or 18. In FIG. 19, elements similar to those shown in FIG. 4 are represented by identical reference numerals. In this reproducing apparatus 196, a groove is formed on one inner side wall of a loading chamber 46 for engagement with the protrusion 189. This protrusion 197 prevents the adapter 85 from being inserted with its right and left sides reversed.

Figure 20:
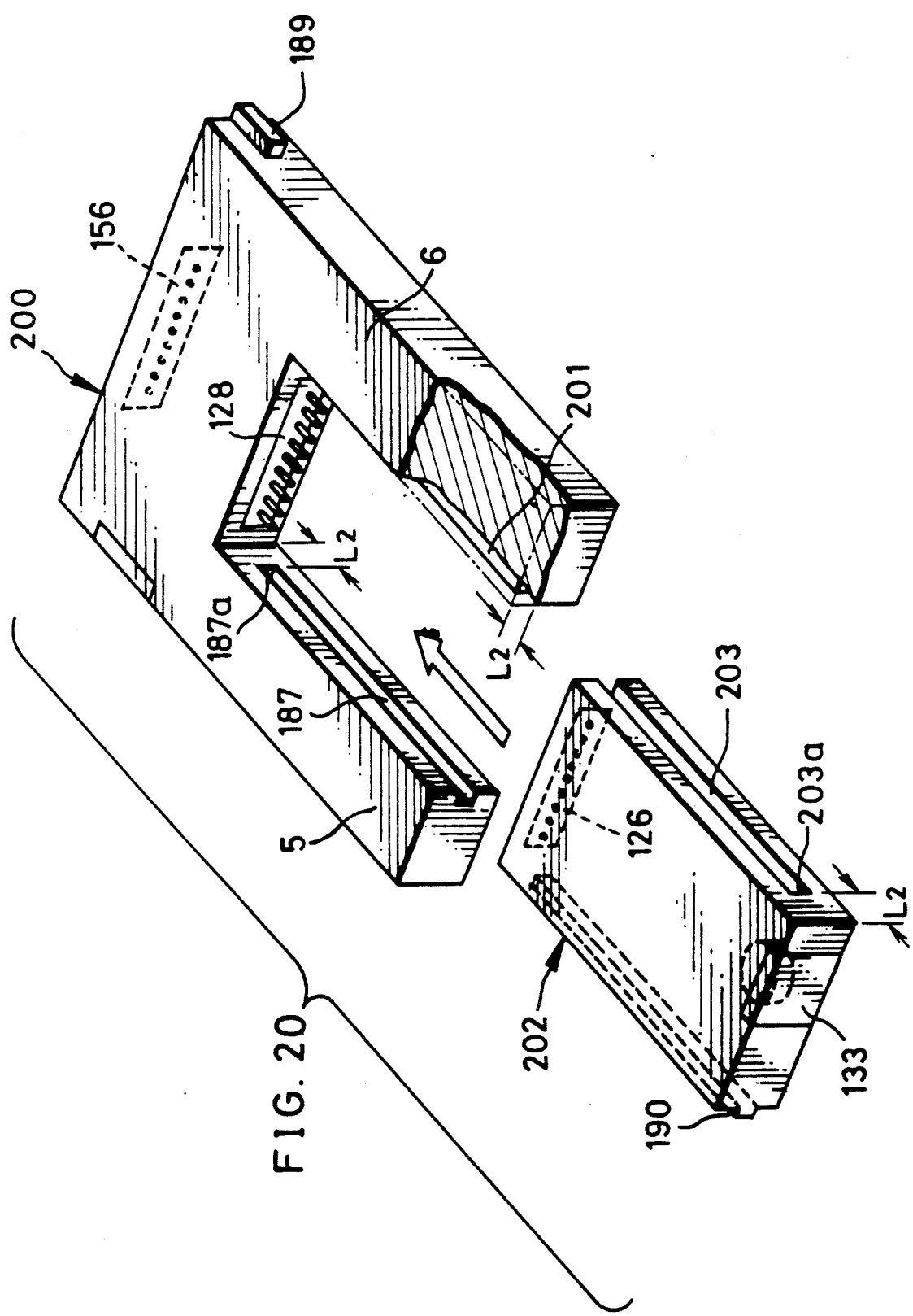
FIG. 20 shows an adapter and a compact memory cartridge according to an embodiment of this invention, wherein, if the compact memory cartridge is pushed into the adapter with its top and bottom surfaces or its right and left sides being reversed, it is prevented from being guided thereinto.

FIG. 20 shows a modification of the memory cartridge system shown in FIG. 17. An adapter 200 of this embodiment is provided with a guide protrusion 201 in place of the guide groove 188. This guide protrusion 201 is formed starting from the position retracted from the front end surface of an arm 6 by a length L2. In correspondence with this guide protrusion 201, a compact memory cartridge 202 is provided with a groove 203 leaving a stop area 203a. Therefore, in this embodiment, the compact memory cartridge 202 can be inserted into the adapter 200 only when the right and left sides are set correctly. If the right and left sides or the top and bottom surfaces are set incorrectly, the compact memory cartridge 202 cannot be inserted into the adapter 200 at all.

The memory circuit used with the above embodiments is a volatile memory circuit. However, a nonvolatile memory circuit may also be used instead. Further, an adapter may have a check circuit for checking the voltage of a battery within the compact memory cartridge, a buffer memory circuit, and the like incorporated therein.

While the present invention has been described in detail with reference to preferred embodiments, various changes and modifications within the scope and spirit of the invention will be apparent to people of working skill in this technological field. Thus, the invention should be considered as limited only by the scope of the appended claims.

What is claimed is:

1. A memory cartridge system comprising:
    a compact memory cartridge;
    an adapter for mounting said compact memory cartridge for loading in a reproducing apparatus; and
    means for holding said compact memory cartridge at a predetermined mounting position in said adapter; and lock means for locking said compact memory cartridge in position so that said compact memory cartridge does not become detached from said adapter;
    said lock means comprising:
    a lock lever which engages a recess of said compact memory cartridge in a lock position;
    a spring for biasing said lock lever in a direction from a lock release position to said lock position; and
    an operating member exposed outside said adapter for moving said lock lever to said lock release position wherein said operating member is disposed within a loading chamber of said reproducing apparatus so as to inhibit access to said operating member, when said adapter is loaded within said loading chamber.

2. A memory cartridge system according to claim 1, wherein said compact memory cartridge is smaller than a standard memory cartridge.

3. A memory cartridge system according to claim 2, wherein a shape of said adapter with said compact memory cartridge mounted thereon is the same as that of said standard memory cartridge when said compact memory cartridge is mounted on said adapter.

4. A memory cartridge system according to claim 3, further comprising regulating means for regulating a direction of insertion of said adapter into a reproducing apparatus which normally is loaded with said standard memory cartridge.

5. A memory cartridge system according to claim 4, wherein said regulating means comprises a protrusion formed on one side of said adapter, and a groove formed on the other side thereof.

6. A memory cartridge system according to claim 4, wherein said adapter includes first and second arms which define a space within which said compact memory cartridge is positioned.

7. A memory cartridge system according to claim 6, wherein said first arm is provided with a guide protrusion extending in a longitudinal direction of said first arm on the surface which contacts said compact memory cartridge, said second arm is provided with a guide groove extending in a longitudinal direction of said second arm on the surface which contacts said compact memory cartridge, and said holding means comprises said guide protrusion and said guide groove.

8. A memory cartridge system according to claim 7, wherein said compact memory cartridge is provided with a groove for engagement with said guide protrusion, and a protrusion for engagement with said guide groove.

9. A memory cartridge system according to claim 6, wherein said lock means 15 is mounted on at least one of said first and second arms.

10. A memory cartridge system according to claim 3, wherein said compact memory cartridge includes a first connector, and said adapter includes a second connector, coupled to said first connector when said cartridge is mounted on said adapter, and a third connector electrically connected to said second connector, wherein said reproducing apparatus includes a fourth connector, and wherein said third connector is coupled to said fourth connector when said adapter with said compact memory cartridge mounted thereon is loaded into said reproducing apparatus.

11. A memory cartridge system according to claim 10, wherein said third connector is the same type as that of said standard memory cartridge, and said second connector is smaller in dimension than said third connector.

12. A memory cartridge system according to claim 10, wherein said adapter comprises first and second arms which define a space within which said compact memory cartridge is positioned.

13. A memory cartridge system according to claim 12, wherein said first arm is provided with a guide protrusion in a longitudinal direction of said first arm on the surface which contacts said compact memory cartridge, and said second arm is provided with a guide groove in a longitudinal direction of said second arm on the surface which contacts said compact memory cartridge.

14. A memory cartridge system according to claim 13, wherein said compact memory cartridge is provided with a groove which engages said guide protrusion and a protrusion which engages said guide groove.

15. A memory cartridge system according to claim 14, wherein said guide groove extends to a position in front of said second connector, and said groove of said compact memory cartridge extends in front of a second surface opposite a first surface where said first connector is mounted, so as to prohibit insertion of said compact memory cartridge into said adapter if top and bottom surfaces or right and left sides of said compact memory cartridge are set incorrectly.

16. A memory cartridge system according to claim 13, wherein said compact memory cartridge has the same width as said standard memory cartridge and a shorter length, and said compact memory cartridge has said second connector mounted at a protruded portion which engages said space.

17. A memory cartridge system according to claim 12, wherein said first connector of said compact memory cartridge protrudes so as to be inserted into said second connector, whereby said compact memory cartridge is held by said adapter in a cantilever fashion.

18. A memory cartridge system to claim 12, wherein said first and second arms are provided with first and second guide grooves respectively on surfaces which contact said compact memory cartridge, in longitudinal directions of said first and second arms, and the widths of said first and second guide grooves are different so as to prevent incorrect setting of right and left sides of said compact memory cartridge.

19. A memory cartridge system according to claim 18, wherein said compact memory cartridge is provided with first and second protrusions for engagement with said first and second guide grooves.

20. A memory cartridge system according to claim 19, wherein said first and second grooves extend to positions retracted from said second connector, and said first and second protrusions extend to positions retracted from said first connector, so as to prevent said compact memory cartridge is prevented from abutting terminals of said second connector if said compact memory cartridge is set with its top and bottom surfaces reversed.

21. A memory cartridge system according to claim 3, wherein said adapter has the same width as said standard memory cartridge and a shorter length, said adapter is provided with a T-shaped guide protrusion extending in a direction perpendicular to a direction of insertion of said adapter into said reproducing apparatus, and said compact memory cartridge is provided with a T-shaped groove adapted to engage said guide protrusion.

22. A memory cartridge system according to claim 3, wherein said adapter is L-shaped, and is provided with a T-shaped guide protrusion extending in a direction perpendicular to the direction of insertion of said adapter into said reproducing apparatus, and said compact memory cartridge is provided with a T-shaped groove adapted to engage said guide protrusion.

23. A memory cartridge system according to claim 1, wherein said adapter contains a battery for supplying power to said compact memory cartridge, and a connector for electrically connecting said battery to said compact memory cartridge.

24. A memory cartridge system according to claim 23, wherein said adapter includes a select knob coupled to a write protect member of said compact memory cartridge.

25. A memory cartridge system comprising:
a compact memory cartridge;
an adapter for accommodating said compact memory cartridge, such that the shape of said adapter with said compact memory cartridge mounted thereon is the same as that of a standard memory cartridge having a predetermined size;
guide means for slidably guiding said compact memory cartridge along said adapter when said compact memory cartridge is mounted on said adapter, said guide means including first and second guide members having different shapes for preventing incorrect settings of right and left sides of said compact memory cartridge; and lock means for locking said compact memory cartridge in position so that said compact memory cartridge does not become detached from said adapter;
said lock means comprising:
a lock lever which engages a recess of said compact memory cartridge in a lock position;
a spring for biasing said lock lever in a direction from a lock release position to said lock position; and
an operating member exposed outside said adapter for moving said lock lever to said lock release position wherein said operating member is disposed within a loading chamber of said reproducing apparatus so as to inhibit access to said operating member, when said adapter is loaded within said loading chamber.

26. A memory cartridge system according to claim 25, further comprising means for locking said compact memory cartridge so as not to detach said compact memory cartridge from said adapter.

27. A memory cartridge system according to claim 26, further comprising means for preventing said compact memory cartridge from being slid into said adapter with top and bottom surfaces of said compact memory cartridge reversed.

28. A memory cartridge system according to claim 27, further comprising means for regulating an insertion state of said adapter, with said compact memory cartridge mounted thereon, into a reproducing apparatus.

29. A memory cartridge system comprising:
a compact memory cartridge having a first connector;
an adapter for accommodating said compact memory cartridge, such that the shape of said adapter with said compact memory cartridge mounted thereon is the same as that of a standard memory cartridge having a predetermined size;
guide means for guiding said compact memory cartridge slidably along said adapter when said compact memory cartridge is mounted on said adapter, said guide means comprising first and second guide members having shapes for preventing incorrect settings of the right and left sides of said compact memory cartridge; and lock means for locking said compact memory cartridge in position so that said compact memory cartridge does not become detached from said adapter;
said lock means comprising:
a lock lever which engages a recess of said compact memory cartridge in a lock position;
a spring for biasing said lock lever in a direction from a lock release position to said lock position; and
an operating member exposed outside said adapter for moving said lock lever to said lock release position wherein said operating member is disposed within a loading chamber of said reproducing apparatus so as to inhibit access to said operating member, when said adapter is loaded within said loading chamber;
a second connector, coupled to said first connector when said compact memory cartridge is mounted on said adapter; and
a third connector, electrically connected to said second connector, and coupled to a fourth connector of a reproducing apparatus when said adapter with said compact memory cartridge mounted thereon is loaded within said reproducing apparatus.

30. A memory cartridge system according to claim 29, further comprising means for preventing said compact memory cartridge from being slid into said adapter with top and bottom surfaces of said compact memory cartridge reversed.

31. A memory cartridge system according to claim 30, further comprising means for regulating an insertion state of said adapter, with said compact memory cartridge mounted thereon, into a reproducing apparatus.

* * * * *